Figure 1:
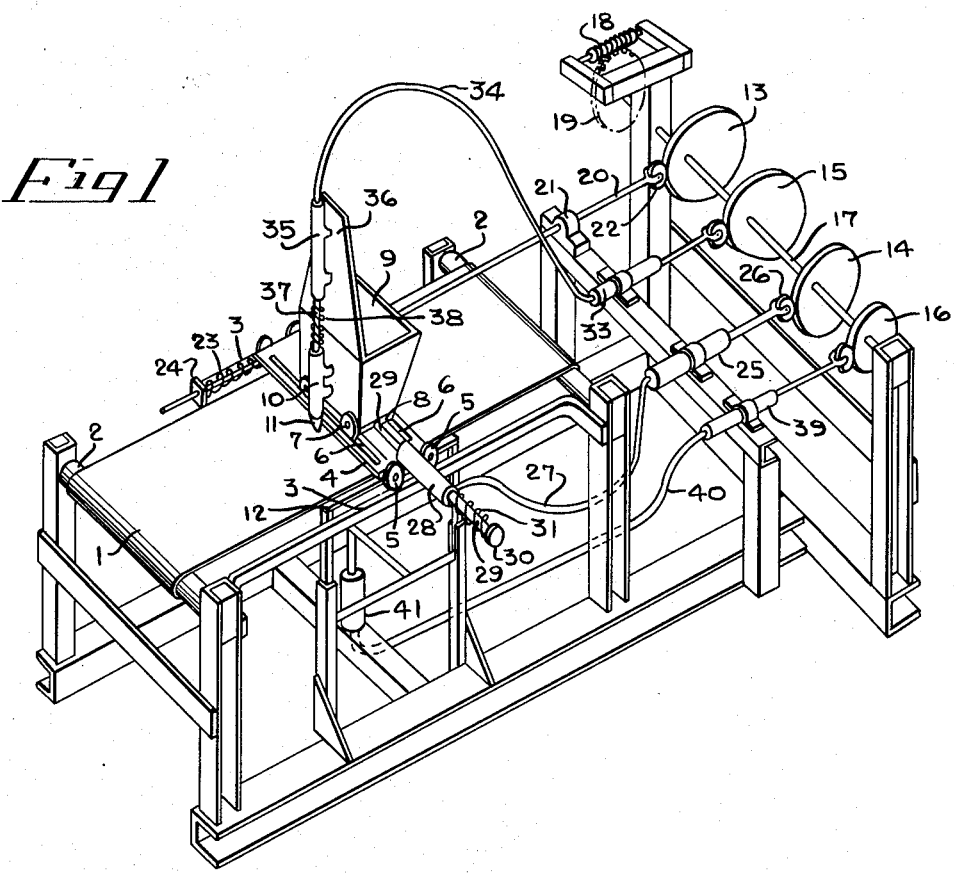

April 17, 1956  J. M. HANSEN ET AL  2,742,000
MACHINES FOR THE EXTRUSION OF CHOCOLATE
PASTE OR A SIMILAR PLASTIC MASS
Filed Sept. 26, 1950  2 Sheets-Sheet 1

INVENTORS:
JENS MOELLER HANSEN,
SIGURD FREDERIK MOELLER
BY                HANSEN, AND
EJVIND MOELLER HANSEN,

By Ernest A. Marmorek,
Their Agent.

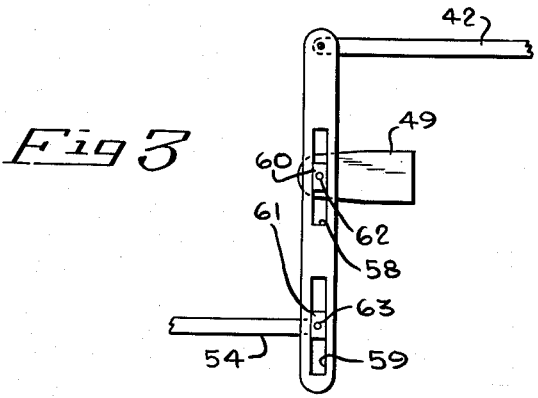
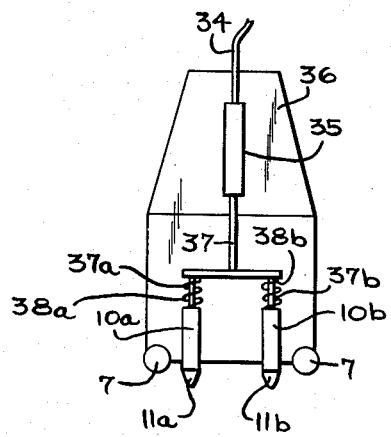

United States Patent Office 2,742,000
Patented Apr. 17, 1956

2,742,000

MACHINES FOR THE EXTRUSION OF CHOCOLATE PASTE OR A SIMILAR PLASTIC MASS

Jens Möeller Hansen, Sigurd Frederik Moeller Hansen, and Ejvind Moeller Hansen, Copenhagen, Denmark, assignors to A/S Toms Laboratorium, Copenhagen, Denmark, a company of Denmark Application September 26, 1950, Serial No. 186,842

Claims priority, application Denmark September 27, 1949

5 Claims. (Cl. 107—27)

The present invention relates to a machine for the extrusion of chocolate paste or a similar plastic mass on to a movable carrier in the shape of twists, rings, branches or other intricate patterns, and which machine is provided with one or several extrusion nozzles to which the paste or mass is conveyed by means of a pump.

Hitherto articles of chocolate paste or a similar plastic mass in the shape of intricate patterns have been made in a primitive manner by means of a cloth bag provided with a nozzle through which the paste or plastic mass is squeezed out of the bag. It has likewise been proposed to employ hand operated nozzles to which the paste or plastic mass is conveyed by means of a pump.

One object of the invention is to provide a machine of of the kind mentioned above which is simple in construction and which will operate faultlessly.

Another object of the invention is to provide a machine of the kind mentioned in which all movable members are operated by means of driven cams.

A further object of the invention is to provide a machine of the kind in question in which all the operating cams are attached to a common shaft.

A still further object of the invention is to provide means for facilitating the production of articles in various intricate designs in a machine of the kind mentioned.

Figure 2:
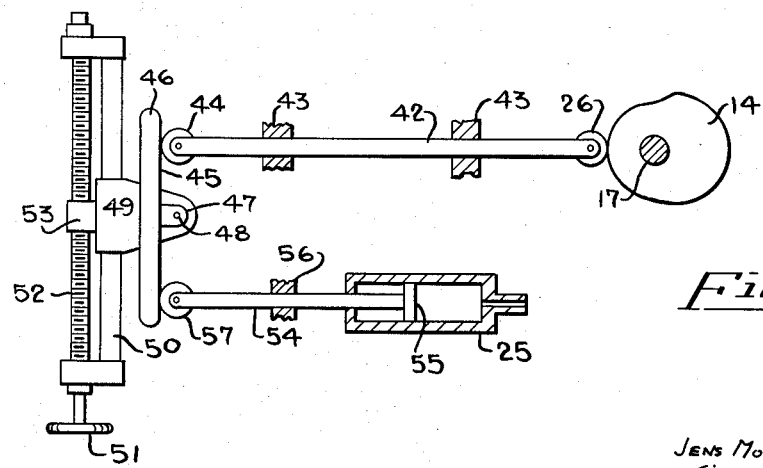

Other objects of the invention will be evident from the following description taken in conjunction with the accompanying drawing which shows by way of example one manner of construction of a machine according to the invention. In the drawing:

Fig. 1 shows schematically and in perspective view the operating parts of the machine, Fig. 2 shows partly in section an exchange mechanism, Fig. 3 is a modified manner of construction of an exchange mechanism; and Fig. 4 is a fragmentary front elevational view, showing a modified detail of Fig. 1.

Referring to Fig. 1, the numeral 1 indicates an endless conveyor belt running over two rollers 2 mounted on the frame of the machine, and on which the figures to be made are formed.

Outside each side of the conveyor belt is arranged a stationary rail 3 for a carriage 4 which is provided with wheels 5 running on the rails for displacement of the carriage longitudinally to the conveyor belt. On the upper side of the carriage 4 are attached spaced rails 6 engaging wheels 7 on a carrier 8, which is displaceable transversely to the conveyor belt 1.

The carrier 8 has attached to its upper side a container 9 for the paste or plastic mass, and to the front wall of this container a pump 10 is attached. The pump is fed with paste or plastic mass from the container and the paste is extruded through a nozzle 11 to the surface of the conveyor belt 1.

The conveyor belt 1 is carried over a table 12 and below the region which is determined by the extent to which the carriage 4 can travel longitudinally over the conveyor belt, and the carrier 8 can be displaced transversely. The table 12 is adjustable vertically in order to vary the distance between the outlet of nozzle 11 and the surface of the conveyor belt 1. For this purpose the table has depending legs slidably mounted in posts forming a part of the frame supporting rollers 2.

The movements of the carriage 4, the carrier 8, the piston of pump 10, and the table 12, are controlled by means of cams 13, 14, 15 and 16 respectively. These cams are all attached to a common shaft 17, which is rotatably journalled in the rear end of the machine frame, and is rotated by means of a worm wheel 19 attached to shaft 17 and a worm gear 18 meshing the worm wheel.

In the manner of construction illustrated the movement of carriage 4 longitudinally to the conveyor belt is effectuated directly by means of the cam 13, the carriage being provided with a rearwardly extending rod 20 which is guided in a stationary bearing 21 and on its rear end carries a roller 22 that abuts the edge of the cam 13. The roller 22 is held to abutment against the cam 13 by means of a spring 23 interposed between a fixed lug 24 and a projection on the carriage.

While the movement of the carriage 4 is brought about by mechanical means, the transverse movement of the carrier 8 is, in the illustrated manner of construction, brought about by hydraulic means from the cam 14. To this end there is arranged in alignment with cam 14 a cylinder 25 provided with a piston, the rod of which carries a roller 26 which abuts the edge of cam 14. The foremost end of the cylinder 25 is by means of a pliable tube 27 connected to a cylinder 28 attached to the carriage 4. The cylinder 28 is provided with a piston and piston rod 29, the latter projecting from both ends of the cylinder. The one end of this piston rod 29 is connected to the carrier 8, and the other end carries an abutment 30 between which and the opposed end of the cylinder 28 a coil spring 31 is inserted, this spring tending to hold the piston rod 29 outwardly displaced and the carrier 8 with the container and the nozzle moved towards the cylinder 28. The cylinder compartments rearwardly of their pistons, and the tube 27, are filled with oil or any other suitable hydraulic medium thus providing a non-resilient connection between the cam 14 and the carrier 8. Owing to the pliability of the tube 27 this connection is independent of the position of the carriage 4.

In a similar manner the piston of the pump 10 is controlled by the cam 15, which operates the piston of a cylinder 33, the cylinder being connected through a pliable tube 34 to a cylinder 35 attached to an upwardly extending board 36 on the container 9, and provided with a piston the rod 37 of which is connected to the piston of pump 10. The spring 38 by means of which oil pressure is maintained in the hydraulic system is interposed between the upper end of the pump cylinder 10 and an abutment on the piston rod 37.

The table 12 is likewise controlled hydraulically by means of its cam 16, there being provided a cylinder 39 connected through a pliable tube 40 to a cylinder 41 rigidly attached within the machine frame and provided with a piston that is connected to the table. In this instance a spring corresponding to springs 31 and 38 is not required, because the weight of the table itself will provide sufficient pressure within the hydraulic system.

The illustrated machine is only provided with a single pump 10, but it will be understood that a plurality of pumps with nozzles can be placed side by side. If a plurality of pumps are employed as shown in Fig. 4, two or more pumps 10a and 10b may be operated by means of the same cam, for instance by the piston rods 37a and 37b of each cylinder being interconnected for simultaneous operation and having springs 38a and 38b engaging a common abutment secured to the lower end of the piston rod 37.

Owing to the fact that the common shaft 17 is driven by means of a worm drive 18, 19 which is approximately self-locking, the reaction forces on the cams which can be quite considerable, will not affect the rotational speed of the shaft.

The conveyor band 1 may run continuously in which instance cam 13 must be shaped in such a manner that it imparts to the carriage 4 and to the nozzle 11 a movement in the direction of movement of the conveyor band, which is equal to the sum of a movement corresponding to the movement of the conveyor band and a component of movement in the direction of travel of the band corresponding to that which at any moment is determined by the shape of the articles to be made. This may either be positive, or negative, or zero.

In most instances cams 13 and 14 are shaped in such a manner that the tangential speed of the nozzle 11 in relation to the figures formed on the conveyor band 1 is constant, in which case cam 15 for determining the quantity of paste or mass to be extruded in any given unit of time, may be so shaped that this quantity is constant. When this cam directly or indirectly actuates the piston in pump 35 which supplies paste or mass to the nozzle, cam 15 may be shaped as a part of an Archimedian spiral.

Usually the cams are shaped in such a manner that a figure is completed during one revolution of the cams, which means during one complete turn of shaft 17, so that the carrier 8 returns to its initial position at the end of this revolution, which on account of the continuous movement of the conveyor band will always be over a part of the band hitherto not used.

In order that the same cams 13, 14 and 15 can be used under varying conditions it may be desirable to interpose an adjustable exchange device between one or several of the cams and the member operated by the cam in question. When the connection between the cam and the member operated thereby is wholly or partly hydraulic, such an exchange device can be placed either in front of or behind this hydraulic mechanism. It is likewise possible to place an exchange device either in front of or behind the hydraulic control mechanism.

Two manners of construction of such an adjustable exchange device, by means of which a constant relation of exchange is ensured in all positions, are illustrated in Figs. 2 and 3.

In the manner of construction shown in Fig. 2 and which is presumed to be interposed between cam 14 and cylinder 25, the cam operates a rod 42 which is slidable in stationary bearings 43. The rod 42 carries on its end opposite that abutting the cam a roller 44 which abuts a plane surface 45 on a lever 46. From this surface 45 the lever has an outwardly extending arm 47 by means of which the lever is fulcrumed on a pin 48 the longitudinal axis of which is spaced the same distance from the surface 45 as the axis of roller 44. The fulcrum pin 48 is attached to a slide 49 displaceable at a right angle to rod 42 along a rigid guide bar 50. Displacement of the slide 49 is effectuated by means of a screw 52 provided with a hand wheel 51 and engaging a nut 53 attached to the slide 49.

A rod 54 which serves as piston rod for the piston 55 in cylinder 25, is guided partly by the cylinder end and partly by a stationary bearing 56. The rod 54 is slidable parallel to the rod 42 and on its free end carries a roller 57 having the same diameter as roller 44 on rod 42. The roller 57 abuts the flat surface 45 of the lever 46. In this construction the theoretical connection points for rods 42 and 54 with the lever 46, viz. rollers 44 and 57 will lie with their centres in alignment with each other and the fulcrum pin 48, and consequently any adjustment of the slide 49 will always produce the same relation of exchange, irrespective of the angular position of the lever 46. The value of this exchange relation is determined by an adjustment of slide 49.

In the modification shown in Fig. 3 rod 42 is pivotally attached to the lever 46, which is provided with two slots 58 and 59 in alignment with each other and each provided with a slidable block 60 and 61 respectively, and each of these blocks is pivotally attached to a pin 62 and 63 respectively. Pin 62 is attached to the slide 49 which is adjustably displaceable at a right angle to rods 42 and 54 in the same manner as shown in Fig. 2. Pin 63 is attached to rod 54. The theoretical points of connection between rods 42 and 54 and the lever 46, and the latter's point of rotation, will also in this case always lie in alignment.

The invention is not restricted to the manners of construction described above, and illustrated in the accompanying drawing, as further modifications are possible within the scope of the invention.

We declare that what we claim is:

1. In an extrusion machine for a plastic mass, in combination, a conveyor having a portion movable in one direction at a predetermined rate of movement, a carrier supported above said conveyor and being movable above said conveyor portion in two perpendicular directions transversely of said direction of conveyor movement and respectively in said direction and opposite thereto and operable to describe relative to said conveyor portion a selectively predetermined figural pattern, a supply container for a plastic mass connected to said carrier and movable therewith, at least one pump including a cylinder and piston mounted on said carrier and movable therewith and being interconnected to said supply container and communicating interiorly therewith to be supplied therefrom with the plastic mass, a single nozzle connected to said pump, said pump being operable to be supplied with the plastic mass and to discharge the same through said nozzle onto said conveyor portion, means for moving said carrier relative to said conveyor portion, and means including a cam for operating said piston.

2. In an extrusion machine for a plastic mass, in combination, a supporting member a carrier supported above said supporting member and being movable above said supporting member longitudinally as well as transversely of said supporting member, a supply container on said carrier and movable therewith, at least one piston pump attached to said supply container and communicating interiorly therewith to be supplied with the plastic mass, one single nozzle on said pump arranged above said supporting member, means operable for moving said carrier to describe relative to said supporting member a selectively predetermined figural pattern, and means including a cam for operating said piston pump.

3. In an extrusion machine for a plastic mass, in combination, a supporting member, a carrier supported above said supporting member and being movable said supporting member longitudinally as well as transversely of said supporting member, at least one piston pump attached to said carrier, one single nozzle on said pump arranged above said supporting member, a supply container for a plastic mass and communicating with the said piston pump for supplying plastic mass to said piston pump, means operable for moving said carrier to describe relative to said supporting member a selectively predetermined figural pattern, and means including a cam for operating said piston pump.

4. In an extrusion machine for a plastic mass, in combination, a frame, a supporting member on said frame, a first carrier displaceable on said frame, a second carrier transversely movable on said first carrier, at least one extrusion nozzle attached to said second carrier and arranged above said supporting member, a piston pump connected to said extrusion nozzle and carried by said second carrier, a supply container connected to the pump, means including a cam for displacing said first carrier on said frame, means including a cam for displacing said second carrier on said first carrier, said displacing means cooperating to move said second carrier to describe relative to said supporting member a selectively predetermined figural pattern, and means including a cam for operating said piston pump.

5. An operating mechanism, for use in connection with a machine for producing figural articles by extrusion of a plastic mass onto a conveyor, having a frame, and a nozzle for depositing said plastic mass onto said conveyor, said mechanism comprising in combination: a carrier supported on said frame and being movable longitudinally and transversely relative to the direction of movement of said conveyor, a piston pump connected to said carrier and movable therewith, said nozzle being connected to said pump for discharge of said plastic mass from said pump through said nozzle, a supply container for said plastic mass supported on said carrier and movable therewith and communicating interiorly with said pump, said pump being operable to receive the plastic mass from said container and to discharge it through said nozzle under pressure of the piston, means operable for displacing said carrier longitudinally and transversely of said conveyor, and means actuatable for operating the piston of said pump comprising a first hydraulic cylinder adjacent said piston and in driving connection with said piston, a second hydraulic cylinder remote therefrom, a flexible hydraulic conduit therebetween, cam and cam follower means adjacent said second hydraulic cylinder and operable to generate therein hydraulic pressure and to transmit said pressure through said conduit to said first cylinder for operating said piston.

References Cited in the file of this patent

UNITED STATES PATENTS

| | | |
|---|---|---|
| 276,096 | Thomas | Apr. 17, 1883 |
| 1,447,166 | Alumbaugh | Mar. 6, 1923 |
| 1,530,710 | Baumgard | Mar. 24, 1925 |
| 1,879,328 | Kremmling | Sept. 27, 1932 |
| 1,903,570 | Kremmling | Apr. 11, 1933 |
| 2,149,173 | Hartman et al. | Feb. 28, 1939 |

FOREIGN PATENTS

| | | |
|---|---|---|
| 598,849 | Great Britain | Feb. 27, 1948 |
| 717,412 | Germany | Feb. 13, 1942 |